(12) United States Patent
Maricondi

(10) Patent No.: US 8,630,943 B2
(45) Date of Patent: Jan. 14, 2014

(54) CASH SWEEP ACCOUNT PLATFORM SYSTEM AND METHOD

(75) Inventor: Louis J. Maricondi, Mount Laurel, NJ (US)

(73) Assignee: BNY Mellon Distributors Holdings Inc., Wilmington, DE (US)

( * ) Notice: Subject to any disclaimer, the term of this patent is extended or adjusted under 35 U.S.C. 154(b) by 644 days.

(21) Appl. No.: 11/803,950

(22) Filed: May 16, 2007

(65) Prior Publication Data
US 2008/0288398 A1  Nov. 20, 2008

(51) Int. Cl.
*G06Q 40/00* (2012.01)
(52) U.S. Cl.
USPC .......................................................... 705/39
(58) Field of Classification Search
USPC ................................................. 705/4, 35–45
See application file for complete search history.

(56) References Cited

U.S. PATENT DOCUMENTS

| | | | |
|---|---|---|---|
| 6,615,188 B1 * | 9/2003 | Breen et al. ................. | 705/37 |
| 7,640,199 B1 * | 12/2009 | Hyland ....................... | 705/35 |
| 7,680,734 B1 * | 3/2010 | Bent et al. .................. | 705/40 |
| 7,689,489 B2 * | 3/2010 | Fergusson ................... | 705/36 R |
| 7,752,107 B1 * | 7/2010 | Bent et al. .................. | 705/35 |
| 2002/0069148 A1 * | 6/2002 | Mutschler et al. .......... | 705/35 |
| 2003/0023531 A1 * | 1/2003 | Fergusson .................. | 705/36 |
| 2003/0130916 A1 * | 7/2003 | Block et al. ................ | 705/35 |
| 2003/0144942 A1 * | 7/2003 | Sobek ......................... | 705/36 |
| 2005/0187858 A1 * | 8/2005 | Graham et al. ............. | 705/37 |
| 2007/0055593 A1 * | 3/2007 | Perrin et al. ................ | 705/35 |
| 2008/0288398 A1 * | 11/2008 | Maricondi ................... | 705/39 |

OTHER PUBLICATIONS

Anonymous, "ABA and bank regulators comment on dealer execeptions from registration", ABA Trust Letter 446 (Jan. 2003), pp. 1-3.*
Foster-Keddie, Kevin, "The investment product payoff", Credit Union Management, Nov. 1993, pp. 1-3.*
Weisul, Kimberly, "Connectivity: Dean Witter's bet on the electronic future", The Investment Dealers' Digest: IDD 63.17 (Apr. 28, 1997), pp. 1-8.*
Hintze, John, "Some Wachovia Reps Cool to Big Bank Brokerage", Bank Investment Consultant, (Feb. 2005), pp. 1-2.*

* cited by examiner

*Primary Examiner* — Mohammad Z Shaikh
(74) *Attorney, Agent, or Firm* — K&L Gates LLP

(57) ABSTRACT

An integrated banking transaction services (IBTS) module receives an instrument from a client to initiate a brokerage transaction between a broker-dealer and an investment firm. The IBTS module transmits a notification message to a broker-dealer that the instrument was presented. The IBTS module receives a confirmation message from the broker-dealer that includes information as to whether to pay the instrument. If the instrument is to be paid, the IBTS module transmits information associated with the brokerage transaction to a sub-accounting engine.

20 Claims, 5 Drawing Sheets

CASH SWEEP ACCOUNT PLATFORM SYSTEM AND METHOD

BACKGROUND

Many investment options are available to investors. Investment firms (funds) provide collective investments that pools money from many investors and invest their money in stocks, bonds, dividends, short-term money market instruments, and/or other securities. Investors may purchase assets from the fund via a fee arrangement from a broker-dealer. A broker-dealer is a company that trades in securities for investors as well as for its own account. In the United States, a broker-dealer must be registered with the U.S. Securities and Exchange Commission. When executing trade orders on behalf of an investor, the broker-dealer is said to be acting as a broker. When executing trades for its own account, the broker-dealer is said to be acting as a dealer. Securities bought from one investor or other firms in the capacity of dealer may be sold to other investors or other firms acting in the capacity of dealer, or they may become a part of the broker-dealer's holdings.

Broker-dealers are required to provide some form of brokerage processing system. The brokerage processing system helps the firms open new accounts, monitor and clear trades, create confirmations, process dividends and corporate actions. The system also helps investors manage their brokerage and idle cash positions left over from brokerage transactions. Idle cash position refers to money that is left over from brokerage transactions. Idle cash from brokerage transactions is generally swept into a brokerage cash management account such as a money market brokerage account that is invested in a money market mutual fund.

To assist the investor in managing their brokerage and cash accounts including idle cash positions, broker-dealers often provide banking type products and services to the investor. These banking type products and services include checking accounts and debit cards tied to an investment vehicle for the brokerage and cash accounts. From time to time a broker-dealer may wish to switch to a new investment firm based on changing market conditions, regulatory pressures, or investor preferences. Switching to a new investment firm, however, creates challenges for the broker-dealer with respect to any banking products offered. For example, if the broker-dealer switches to a new investment vehicle provided by a new investment firm (e.g., a new mutual fund company) the broker-dealer must endure the costly and painful process of changing the banking products or services provided to the investor to make the new investment vehicle available to the investor. Changing banking products may include repopulation of the investor's checkbooks and/or issuing new debit cards to the investor. The broker-dealer must repopulate the checkbook every time there is a change in the investment vehicle from a new investment firm provided to investors. Repopulating checkbooks and issuing new debit cards creates a conversion expense for the broker-dealer, leads to client dissatisfaction, and presents unique and difficult challenges for the broker-dealer in terms of offering a mix of banking tools and services with investment vehicles whose performance is tied to market conditions.

Securities processors like, ADP/Broadridge and Thomson's Beta offer multiple funds for Cash Management Accounts (CMA) on their brokerage processing system. These solutions, however, require the cooperation of a bank or other financial institution to provide the banking products and services to their investors. In addition, the brokerage processing solutions are costly, do not provide asset allocation features, and require a significant amount of customization. Customizing a brokerage processing system requires substantial one-time up-front investment costs and ongoing maintenance costs.

FIG. 1 illustrates a conventional system 100 employing integrated banking transaction services 116 (IBTS), which is described in more detail below. A broker-dealer 102 manages investor brokerage cash accounts in-house through a relationship with a banking service provider 110. When an investor (e.g., a client of the broker-dealer 102) opens a brokerage account with the broker-dealer 102, they are given the option of opening an investment account and/or a cash management account.

The broker-dealer 102 generally offers two main cash management account options for the investor. One cash management account option is a money-market mutual fund account provided by an investment firm or fund. Money-market mutual fund accounts levy a management fee, pay an interest rate that mirrors prevailing short-term rates, and are not insured. Another cash management account option is a bank-deposit sweep account. Bank-deposit sweep accounts generally pay less interest than money-market mutual fund accounts and are insured.

The broker-dealer 102 may provide brokerage accounts through an investment firm 106 (e.g., a mutual fund company or "fund"). Idle cash positions are swept 104 into the brokerage account managed by the fund 106. Idle cash positions arise from cash left over from brokerage transactions. For example, buying and/or selling securities may give rise to an idle cash position, which is then swept 104 into the brokerage account. The fund 106 may offer a money market mutual fund (e.g., $Fund_1$) as a brokerage account in which to sweep 104 the idle cash. The investor can access cash held in their brokerage accounts through checkbooks 112 and debit cards 114 (or other banking products or services) issued on behalf of the broker-dealer 102 by a banking service provider 110. Through the checkbooks 112 and debit cards 114 the client can easily access idle cash from liquidated securities from their brokerage account to make purchases. The broker-dealer 102 pays banking service fees 118 to the banking service provider 110 for providing checkbooks 112, debit cards 114, and/or other banking products or services, to the client. The fund 106 pays basis points (bps) fees 108 to the broker-dealer 102.

Through the banking service provider 110, the broker-dealer 102 may provide accounts insured by the Federal Deposit Insurance Corporation (FDIC) to clients. If the broker-dealer 102 changes the brokerage account from one fund 106 to another investment firm or fund 206 ($Fund_n$), the client will be minimally affected because their checkbooks 112 and debit cards 114 are provided by the banking service provider 110 and not by the broker-dealer 102. Accordingly, there is no need for the client to change their checkbooks 112 and debit cards 114 and the broker-dealer 102 can offer more of a turnkey service.

FIG. 2 illustrates a conventional system 200 that does not employ the IBTS 116 services described in the system 100 shown in FIG. 1. With reference to the system 200, the fund 106 offers end-to-end cash management account solutions either in-house or through a relationship with a third-party banking services provider 204. In the system 200, the fund 106 may provide banking services to the client either in-house or through a relationship with a banking services provider 204. This is in contrast to the system 100 illustrated in FIG. 1 where the broker-dealer 102 rather than the fund 106 has a relationship with the third party banking service provider 110. Thus either the fund 106 or the third party banking services provider 204 issues the checkbooks 112 or the debit cards 114 to the client on behalf of the fund 106. Because the system 200 does not employ the IBTS 116 services, the fund 106 manager pays fees 202 in terms of basis points (bps) to the broker-dealer 102. The fees 202 paid to the broker-dealer 102, however, are 12b-1 fees minus any banking service costs incurred by the fund 106 in providing, managing, or paying for issuing the checkbooks 112 and debit cards 114 to the client. The fund 106 manger deducts the banking services costs from 12b-1 paid to the broker-dealer 102 on assets. Such transactions, however, obscure the banking services fees and make it seem as though the banking services are "free".

In addition, the system 200 illustrated in FIG. 2 makes it difficult for the broker-dealer 102 to offer insured FDIC products to the clients. For example, if the fund 106 does not offer an FDIC product, the broker-dealer 102 must make arrangements with a new fund 206 that offers an FDIC product or potentially lose the client. When the broker-dealer 102 makes arrangements with the new fund 206 to provide an FDIC product, however, the new fund 206 must issue new checkbooks 212 and new debit cards 214 to the client. In the United States, however, such an FDIC arrangement with the new fund 206 may be of interest to federal regulators. This is particularly true in regards to banked-on broker-dealers 102 that offer FDIC products and then maintain those assets on their books (e.g., accounting records, such as ledgers and journals). The federal regulators have an interest in ensuring that there was full disclosure to the client concerning the new fund 206. There must be full disclosure to the client that the product offered is insured by the FDIC and the disclosure must be was made with candor. For example, the client must be informed that the principal is insured in FDIC accounts and is not insured in money-market accounts. The client also must be informed that the performance of a money market fund is tied to the financial markets and is not guaranteed.

In the system 200, full disclosure requirements and payment of 12b-1 fees on assets leave the broker-dealer 102 with limited opportunities. The broker-dealer 102 can either address the regulatory issues and accept potential client fallout, or switch to the new fund 206. As discussed above, if the broker-dealer 102 switches to the new fund 206, however, the broker-dealer 102 incurs conversion costs associated with repopulating checkbooks 212 and debit cards 214, which may cost approximately $7 per shareholder account. The broker-dealer 102 also may be bound to investment vehicles arranged through or provided by the fund 106 and may switch only upon payment of conversion costs. The broker-dealer 102 will incur significant costs if it swaps mutual fund investment vehicles in a cash management account without re-issuing checkbooks and debit cards to each and every client (e.g., shareholder) at significant cost. Furthermore, the broker-dealer 102 is unable to easily offer multiple fund options for cash management accounts.

Accordingly, there is a need for a brokerage system to provide cash sweep account products and services to manage brokerage cash sweep accounts and provide multiple fund options (e.g., mutual fund supermarket), asset allocation, and full integration within a single platform to the client. There is a need for a brokerage system that enables multiple money market accounts to act as investment vehicles for cash sweep accounts, to accommodate multiple investment funds (e.g., money market funds, FDIC accounts), and enables swapping investment vehicles without incurring conversion expenses or impacting the client by necessitating the reissue of checkbooks and debit cards to each and every shareholder at a significant cost per account.

SUMMARY

In one embodiment, an integrated banking transaction services (IBTS) module receives an instrument from a client to initiate a brokerage transaction between a broker-dealer and an investment firm. The IBTS module transmits a notification message to a broker-dealer that the instrument was presented. The IBTS module receives a confirmation message from the broker-dealer comprising information as to whether to pay the instrument. If the instrument is to be paid, the IBTS module transmits information associated with the brokerage transaction to a sub-accounting engine.

DESCRIPTION

Figure 1:
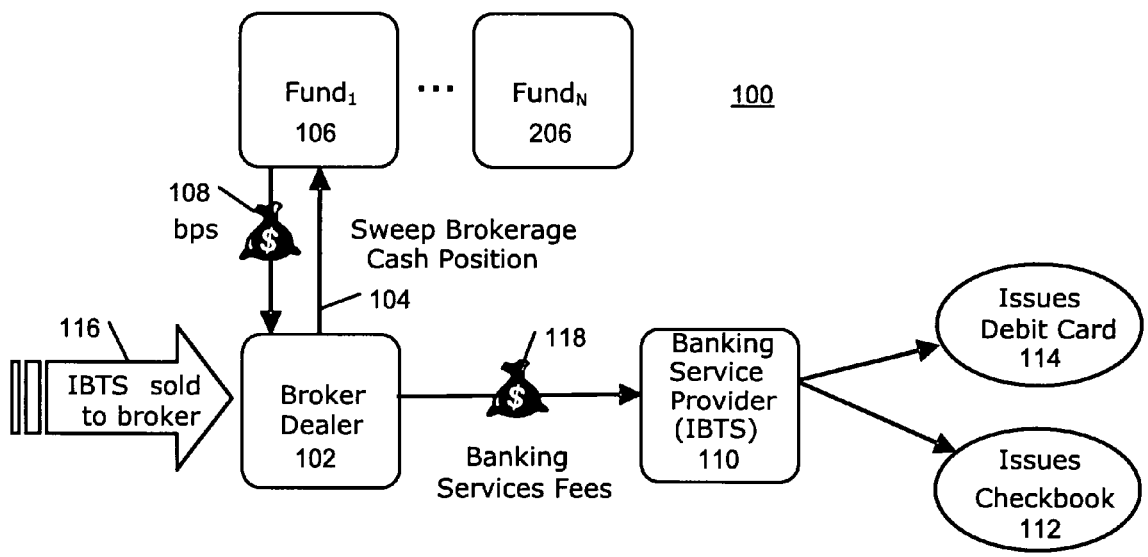
FIG. 1 illustrates a conventional system employing integrated banking transaction services.
Figure 2:
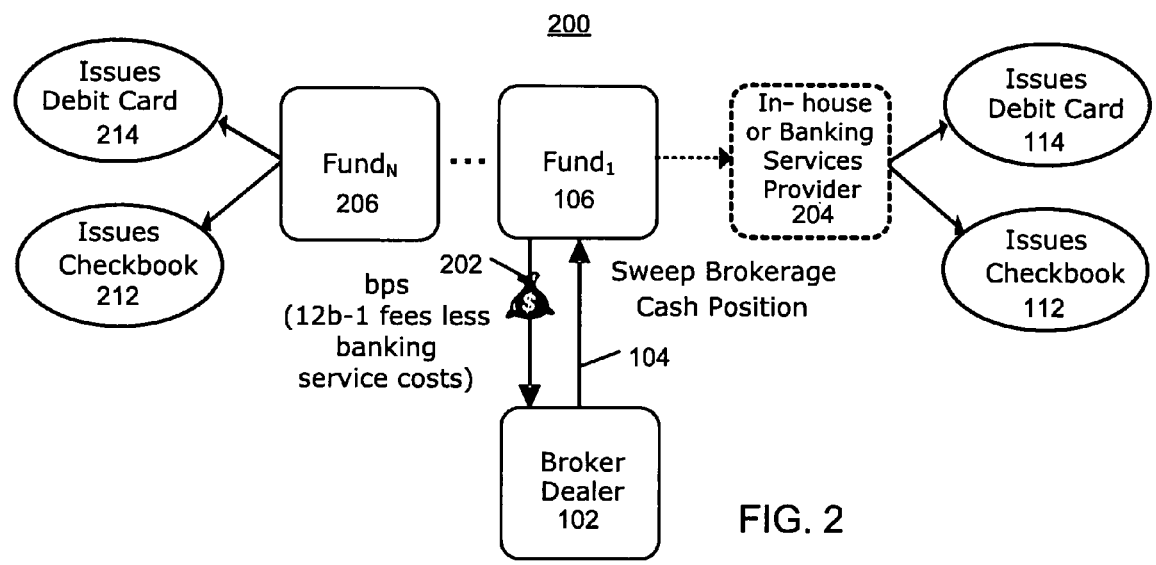
FIG. 2 illustrates a conventional system that does not employ the IBTS services described in the system shown in FIG. 1.
Figure 3:
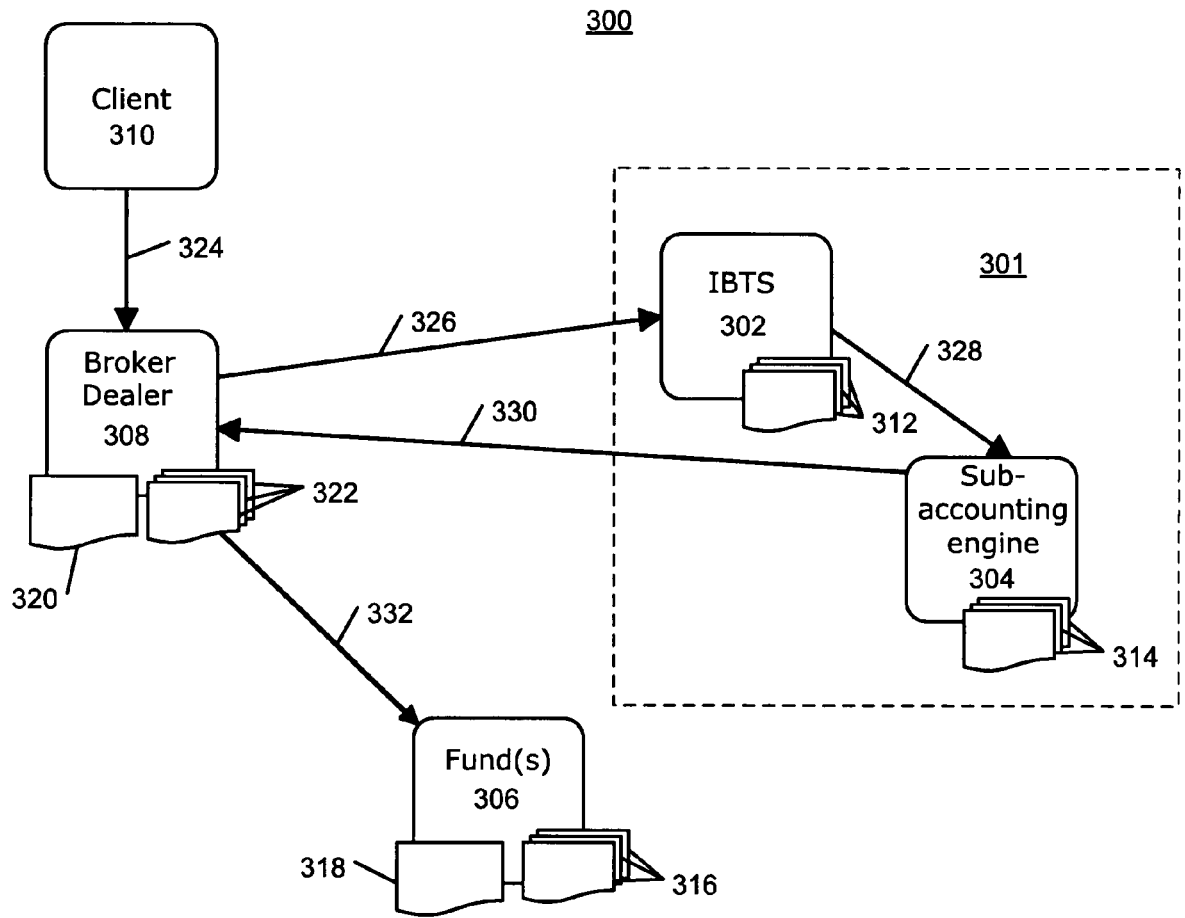
FIG. 3 illustrates one embodiment of a cash sweep brokerage system.

FIG. 3 illustrates one embodiment of a cash sweep brokerage system 300. The cash sweep brokerage system 300 is described with respect to an account model designated by the various modules and a data flow designated as arrows connecting the various modules. With reference to the account model, the cash sweep brokerage system 300 comprises an open asset management account (AMA) platform 301 comprising an IBTS module 302 combined with a subaccounting engine 304 to manage cash sweep accounts on behalf of a client 310. The IBTS module 302 includes banking transaction modules. The subaccounting engine 304 includes comprehensive recordkeeping modules. In the illustrated embodiment, the IBTS module 302 and the subaccounting engine 304 interact with a broker-dealer 308 brokerage processing system. Additional connectivity between the IBTS module 302 and the subaccounting engine 304 may be implemented as may be required. The subaccounting engine 304 provides investment fund (e.g., mutual fund) supermarket capabilities. With the combination of the IBTS module 302 and the subaccounting engine 304, the open AMA platform 301 enables multiple fund options, asset allocation, and full integration into the broker-dealer 308 brokerage processing system. The broker-dealer 308 interfaces with an investment vehicle provider 306 (fund). The open AMA platform 301 enables multiple brokerage investment accounts (e.g., money market accounts) to act as vehicles for a cash sweep account, accommodates multiple providers of the brokerage investment vehicles (e.g., money market funds), minimizes or eliminates expenses to the broker-dealer 308 for swapping out investment vehicles, and minimizes or eliminates impacts to the client 310 when investment vehicles are swapped by the broker-dealer 308. The embodiments are not limited in this context.

In one embodiment, accounts on the IBTS module 302 and positions on the subaccounting engine 304 are held at the individual account 312, 314 levels, respectively. Accounts at the fund 306 may be held as individual accounts 316 or omnibus accounts 318. The broker-dealer 308 may house either omnibus account positions 320 or individual accounts 322 on the brokerage processing system. The embodiments are not limited in this context.

In one embodiment, the open AMA platform 301 comprising the IBTS module 302 and the subaccounting engine 304 provides banking transaction services to the broker-dealer 308 and the fund 306. The IBTS module 302 provides check processing services with online bill payment and presentment, debit card, and automated clearing house (ACH) capabilities. The IBTS module 302 is an integral component to managing the client 310 cash sweep account. The embodiments are not limited in this context.

In one embodiment, the IBTS module 302 provides automated teller machine (ATM) deposit services. In this respect, the IBTS module 302 enables the client 310 to deposit funds into one or more brokerage accounts 320, 322 held at the broker-dealer 308 via ATMs tied to an individual account 312 held at the IBTS module 302. In various implementations, the ATM service may be implemented and is currently available at multiple nationwide ATMs that accept deposits within the STARS® and PLUS® networks, for example. Via the IBTS module 302, the client 310 funds may be moved from the IBTS individual account 312 to the brokerage investment omnibus or individual accounts 320, 322 in a paperless transaction environment. This assists in streamlining broker-dealer 308 back-office operations. It also speeds up the processing time for deposits and provides the client 310 with a convenient way to deposit funds into the broker-dealer omnibus or individual accounts 320, 322. The embodiments are not limited in this context.

In one embodiment, the IBTS module 302 provides cash sweep account management services for the client 310. The open AMA platform 301 comprising the IBTS module 302 in combination with the subaccounting engine 304 provides banking transaction services and enables cash sweep transactions of any idle cash positions held by the client 310. Idle cash is automatically transferred or swept into one of several available investment vehicles (e.g., money market) held in the omnibus or individual brokerage accounts 320, 322. Accordingly, the broker-dealer 302 provides turnkey services to enhance value for the client 310. The embodiments are not limited in this context.

In one embodiment, the IBTS module 302 provides bill payment and presentment services. In this respect, the IBTS module 302 comprises electronic bill payment and presentment modules to enhance the services provided by the open AMA platform 301. The IBTS module 302 employs secured bill payment transaction modules to provide secure bill payment services such as paying bills in a paperless environment via the Internet, for example. The embodiments are not limited in this context.

In one embodiment, the subaccounting engine 304 provides comprehensive recordkeeping for all classes of proprietary and non-proprietary of investment vehicles (e.g., stock, bond, or money market mutual funds), including full accounting, tax reporting, and statement generation for the client 310. The subaccounting engine 304 enables financial institutions (e.g., banks, brokerage firms, funds) to consolidate asset and activity reporting through their own systems by bringing shareholder accounting and administration in-house and by clearing trades (e.g., mutual fund trades). Transactions can quickly be spread across multiple families of investment vehicles (e.g., mutual fund vehicles) and other products, such as variable annuities, stocks, bonds, and other securities or investment vehicles. As previously discussed, the subaccounting engine 304 provides omnibus accounts 316 capabilities held at the fund 306. Accordingly, the broker-dealer 308 can control the client 310 accounts 316, 320, 322 directly to save time and reduce trading and, thus, to increase the efficiency of the broker-dealer 308. The embodiments are not limited in this context.

With reference to the data flow in the brokerage system 300, the client 310 funds 324 a new omnibus and/or individual account 320, 322 at the broker-dealer 308. The broker-dealer 308 transmits 326 data associated with the account 320, 322 to the IBTS module 302 where it may be stored in the IBTS individual account 312. The IBTS module 302 transmits 328 the new updated account data to the subaccounting engine 304 where it may be stored in the subaccounting engine individual account 314. The subaccounting engine 304 transmits 330 the updated account data the broker-dealer 308. The broker-dealer 308 then transmits 332 a brokerage transaction (e.g., trade) request to the fund 306. The embodiments are not limited in this context.

In various embodiments, the cash sweep brokerage system 300 provides multiple investment vehicles (e.g., money market funds) for cash sweep accounts, multiple providers of the investment vehicles, and the ability to swap out investment vehicles without incurring expenses or substantially affecting the client 310. The cash sweep brokerage system 300 may be employed to render cash sweep account services to manufacturers and distributors in the financial industry. The embodiments are not limited in this context.

Accordingly, as described in more detail below with reference to FIG. 4, in various embodiments the cash sweep brokerage system 300 provides an open AMA platform 301 to manage cash sweep accounts employing a combination of the IBTS module 302 and the subaccounting engine 304. The cash sweep brokerage system 300 provides the broker-dealer 308 with open and flexible cash sweep account management platform that enables the broker-dealer 308 to offer more investment products and greater flexibility, provide access to multiple sweep options, reduce product conversion costs and inconvenience, gain fund program flexibility, and segment your client base to provide robust services to your best customers. These offerings may be tailored to meet specific client needs. The embodiments are not limited in this context.

The cash sweep brokerage system 300 provides the broker-dealer 308 with the necessary flexibility to service the client 310 accounts 320, 322 and to provide cash sweep account management services to the client 310. The subaccounting engine 304 provides mutual fund supermarket capabilities. In combination with the IBTS module 302 banking services, the subaccounting engine 304 enables the broker-dealer 308 to offer optimum investment products and banking services to the client 310.

The cash sweep brokerage system 300 open AMA platform 301 also assists the broker-dealer 308 to gather and retain assets, meet regulatory requirements, and increase operational efficiencies in a platform that allows greater investment choices and additional options to the client 310 that are connected to industry-leading banking tools. The broker-dealer 308 may change the fund 306 provider without the costly, cumbersome process of repopulating checkbooks. The new choices will be available to the client 310 without changing their banking products such as checkbooks or debit cards.

The open AMA platform 301 allows the broker-dealer 308 to provide multiple fund options, asset allocation, and full integration within a single platform. Accordingly, the broker-dealer 308 can offer investment vehicle providers on one platform, varied investment vehicles to manage cash sweep accounts, including money market funds, FDIC funds, health savings accounts (HSA), home equity line of credit accounts, and the ability to change and/or add investment vehicle providers without incurring expenses or substantially affecting the client 310.

Figure 4:
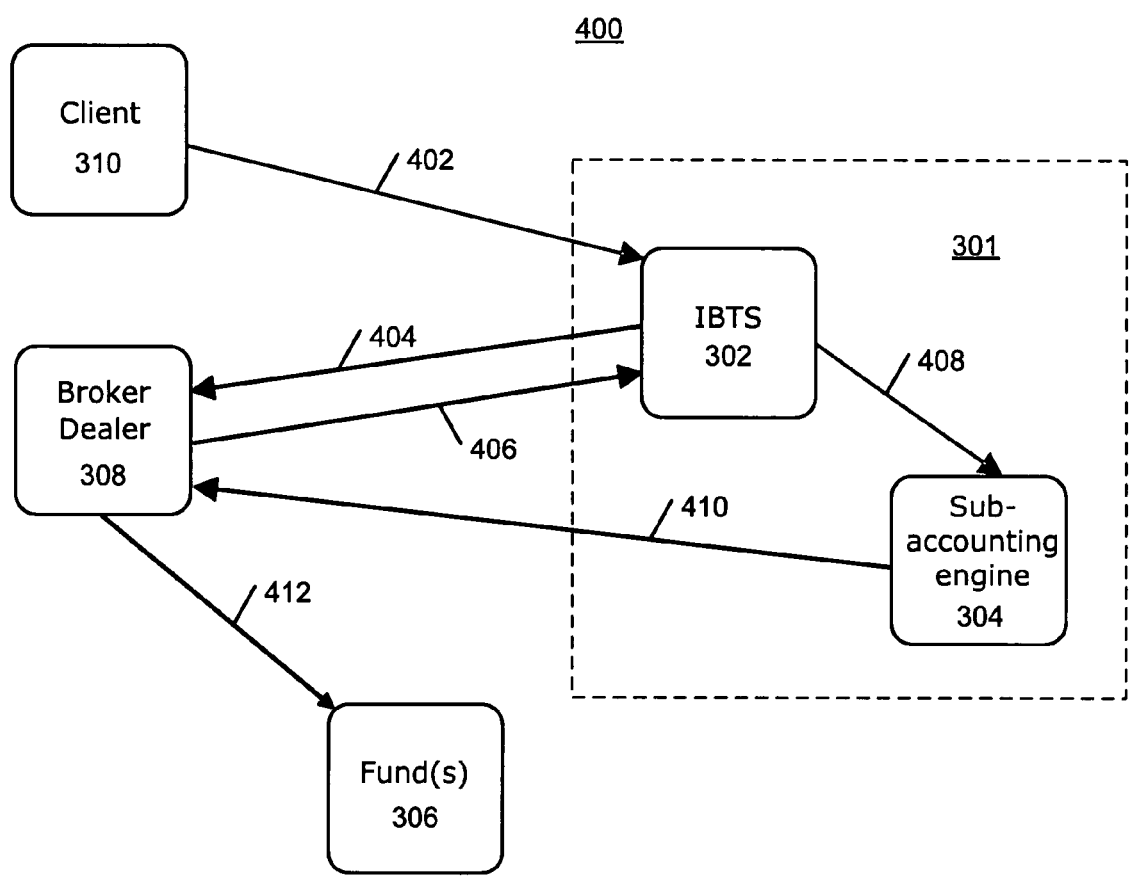
FIG. 4 illustrates one embodiment of a cash sweep transaction flow diagram employing the cash sweep brokerage system illustrated in FIG. 3.

FIG. 4 illustrates one embodiment of a cash sweep transaction flow diagram 400 employing the cash sweep brokerage system 300 illustrated in FIG. 3. As previously discussed, the system 300 provides a cash sweep account management platform to enable multiple fund options, asset allocation, and full integration into the broker-dealer 308 brokerage processing system. In one embodiment, multiple money market funds may act as the investment vehicles for managing the cash sweep accounts. The system 300 can easily accommodate multiple providers of investment vehicles (e.g., money market funds). Accordingly, swapping out investment vehicles does not incur expenses or impact the client 310. The broker-dealer 308 may now offer the client 310 the most suitable banking tools in conjunction with the best most suitable investment products available on the market.

As previously discussed, in the illustrated embodiment, the IBTS module 302 and the subaccounting engine 304 interact with the broker-dealer 308 brokerage processing system. The client 310 initiates a transaction by presenting an instrument such as writing a check, initiating a debit transaction, and the like to the IBTS module 302. The instrument is to initiate a brokerage transaction between the broker-dealer 308 and an the fund 306. The IBTS module 302 receives 402 the transaction and notifies 404 the broker-dealer 308 that client 310 presented an instrument by transmitting a message to the broker-dealer 308. The broker-dealer 308 confirms to the IBTS module 302 whether or not the instrument presented should be paid by transmitting a message to the IBTS module 302. When the IBTS module 302 receives 404 the confirmation from the broker-dealer 308 that the instrument should be paid, the IBTS module 302 transmits 408 trade information (e.g., data) to the subaccounting engine 304. The subaccounting engine 304 transmits 410 the trade information to the broker-dealer 308 including a request to the broker-dealer 308 to execute the brokerage transaction between the broker-dealer 308 and the fund 306. The broker-dealer 308 then submits 412 a request to execute a brokerage transaction with the fund 306.

If market conditions change due to regulatory pressures or client desires, there is no need to change to a new fund provider and endure the costly and inconvenient process of repopulating checkbooks for the client 310. The broker-dealer 308 can readily make any necessary changes on the broker-dealer 308 open AMA platform 301 and the new choices will be available to the client 310 without changing banking products or services. This eliminates conversion expenses for the banking products and services (e.g., checkbooks, debit cards).

Figure 5A:
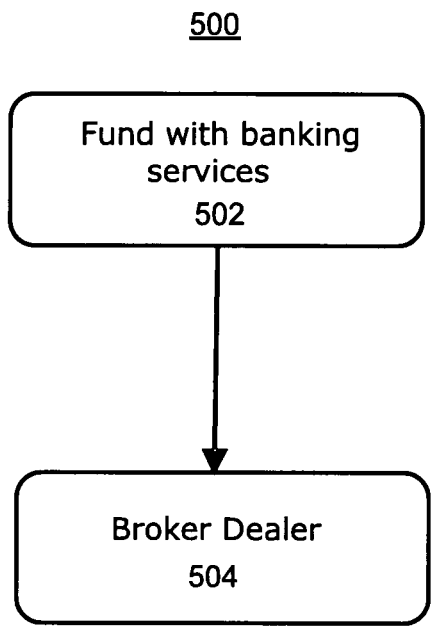
FIGS. 5A and 5B illustrate embodiments of fee flow diagrams for cash sweep account management as discussed above with reference to FIGS. 3 and 4.
Figure 5B:
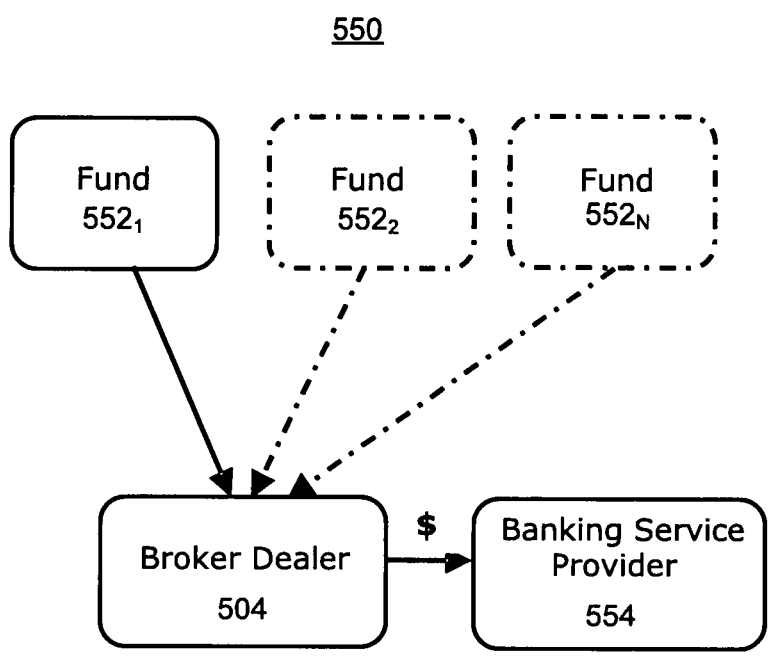

FIGS. 5A and 5B illustrate embodiments of fee flow diagrams for cash sweep account management as discussed above with reference to FIGS. 3 and 4. FIG. 5A illustrates one embodiment of an implicit fee flow diagram 500 for cash sweep account management. A fund 502 with in-house banking services pays basis point fees to a broker-dealer 504. The broker-dealer 504 pays banking service fees to the fund 502. The broker-dealer 502 receives banking services and basis point fees from the fund 502. The broker-dealer 504, however, is locked into the fund 502 for banking services and investment vehicles.

FIG. 5B illustrates one embodiment of an explicit fee flow diagram 550 for cash sweep account management. Multiple funds $552_1$ through $552_N$ pay basis point fees to the broker-dealer 504. The broker-dealer 504, however, has a separate relationship with a banking service provider 554. The broker-dealer 504 pays the banking service provider 554 for banking services independent of the broker-dealer 504 relationship with the funds $552_1$ through $552_N$. The broker-dealer 504 now operates independently from the funds $552_1$ through $552_N$. With an open AMA platform, the funds $552_1$ through $552_N$ compete on performance and the broker-dealer 502 is not locked into a relationship with the funds $552_1$ through $552_N$.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 6:
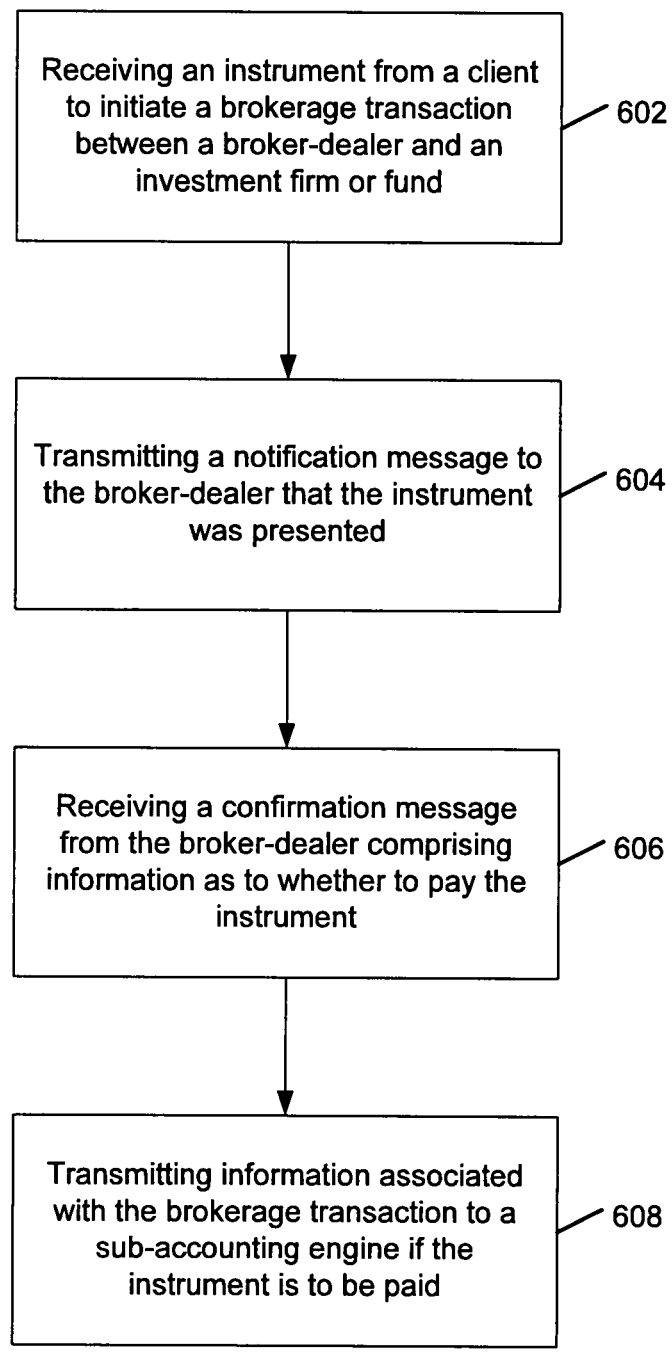
FIG. 6 illustrates a logic diagram.

FIG. 6 illustrates a logic diagram 600. Logic diagram 600 may be representative of the operations executed by one or more systems described herein, such as the system 300, 400. As shown in logic diagram 600 the IBTS module 302 receives 602 an instrument from the client 310. The instrument is to initiate a brokerage transaction between the broker-dealer 308 and the investment firm or fund 306. The IBTS module 302 transmits 604 a notification message to the broker-dealer 308 that the instrument was presented. The IBTS module 302 receives 606 a confirmation message from the broker-dealer 308 comprising information as to whether to pay the instrument. If the instrument is to be paid, the IBTS module 302 transmits 608 information associated with the brokerage transaction to the sub-accounting engine 304.

In one embodiment, the information associated with the brokerage transaction is transmitted from the sub-accounting engine 304 to the broker-dealer 308. The sub-accounting engine 304 transmits a request to the broker-dealer 308 to execute the brokerage transaction between the broker-dealer 308 and the investment firm 306. The instrument may be received at the IBTS module 302 from the client 310 in the form of a check or a debit card transaction. The IBTS module 302 receives fees for banking services provided to the broker-dealer 308 independent of a relationship between the broker-dealer 308 and the investment firm 306.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

In various implementations, the system 300 may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers, servers, clients, network switches and routers), software components (e.g., programs, subroutines, logic) and/or combination thereof.

In various embodiments, the system 300 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The modules may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context Unless specifically stated otherwise, it may be appreciated that terms such as "processing", "computing", "calculating", "determining", or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A cash sweep brokerage system, comprising:
an asset management account platform to manage a cash sweep account on behalf of a client of a broker-dealer, the asset management account platform communicatively coupled to a broker-dealer brokerage processing system and multiple investment vehicle providers, the asset management account platform operative to enable multiple brokerage investment accounts to act as vehicles for a cash sweep account and to interact with the broker-dealer brokerage processing system and the multiple investment vehicle providers to process brokerage transactions between the client, the broker-dealer, and one or more of the multiple investment vehicle providers, the asset management account platform comprising:
an integrated banking transaction services processor operative to provide banking transaction services, wherein the integrated banking transaction services processor provides banking transaction services independent of the broker-dealer relationships with the multiple investment vehicle providers, wherein the integrated banking transaction services processor is configured to manage the cash sweep brokerage account; and a sub-accounting engine communicatively coupled to the integrated banking transaction services processor operative to provide comprehensive recordkeeping and to provide multiple investment vehicle options to the client from the multiple investment vehicle providers independent of the banking transaction services provided to the client by the banking transaction services processor in order to minimize expenses to the broker-dealer by allowing the client to swap out investment vehicles between the multiple investment vehicle providers without requiring a corresponding change in the banking transaction services;

the integrated banking services transactions processor operative to receive an instrument from the client, initiate a brokerage transaction between the broker-dealer and the investment vehicle provider, transmit a notification message to the broker-dealer that the instrument was presented, receive a confirmation message as to whether to honor the instrument, and transmit information associated with the brokerage transaction to the sub-accounting engine.

2. The system of claim 1, wherein the integrated banking transaction services processor is operative to transmit the information associated with the brokerage transaction from the sub-accounting engine to the broker-dealer.

3. The system of claim 2, wherein the integrated banking transaction services processor is operative to transmit a request to the broker-dealer to execute the brokerage transaction between the broker-dealer and the investment vehicle provider.

4. The system of claim 1, wherein the integrated banking transaction services processor is operative to receive any one of a check and a debit card transaction as the instrument from the client.

5. The system of claim 1, wherein the integrated banking transaction services processor is operative to receive fees for banking services provided to the broker-dealer independent of a relationship between the broker-dealer and the investment vehicle provider.

6. The system of claim 1, wherein the sub-accounting engine is operative to receive information associated with the brokerage transaction from the integrated banking transaction services processor when the instrument is to be honored.

7. The system of claim 6, wherein the sub-accounting engine is operative to transmit the information associated with the brokerage transaction to the broker-dealer.

8. The system of claim 7, wherein the sub-accounting engine is operative to transmit a request to the broker-dealer to execute the brokerage transaction between the broker-dealer and the investment vehicle provider.

9. The system of claim 6, wherein the integrated banking transaction services processor is operative to receive any one of a check and a debit card transaction as the instrument from the client.

10. The system of claim 6, wherein the integrated banking transaction services processor is operative to receive fees for banking services provided to the broker-dealer independent of a relationship between the broker-dealer and the investment vehicle provider.

11. A method, comprising:
initiating a brokerage transaction between a broker-dealer and an investment vehicle provider when an integrated banking transaction services processor is in receipt of an instrument from a client of the broker-dealer;
transmitting a notification message from the integrated banking transaction services processor to the broker-dealer that the instrument was presented;
receiving a confirmation message by the integrated banking transaction services processor from the broker-dealer, the confirmation message comprising information as to whether to honor the instrument and initiate the brokerage transaction between the broker-dealer and the investment vehicle provider;
when the instrument is to be honored, transmitting information associated with the brokerage transaction from the integrated banking transaction services processor to a sub-accounting engine;
automatically transferring idle cash into at least one investment vehicle held in a brokerage account; and
providing, by the sub-accounting engine, banking transaction services to the broker-dealer and the investment vehicle provider, wherein banking transaction services are provided independent of the broker-dealer relationship with the investment vehicle provider, wherein the integrated banking transaction services processor is configured to manage a cash sweep brokerage account; and
providing, by the sub-accounting engine, investment vehicle options to the client in more than one investment vehicle provider independent of the banking transaction services provided to the client by the banking transaction services processor to allow a client to select between the more than one investment vehicle provider without incurring instrument conversion expenses to the broker-dealer associated with changing a banking service provider.

12. The method of claim 11, comprising transmitting the information associated with the brokerage transaction from the sub-accounting engine to the broker-dealer.

13. The method of claim 12, comprising transmitting a request to the broker-dealer from the sub-accounting engine to execute the brokerage transaction between the broker-dealer and the investment vehicle provider.

14. The method of claim 11, wherein receiving an instrument from the client comprises receiving any one of a check and a debit card transaction at the integrated banking transaction services processor.

15. The method of claim 11, comprising receiving fees for banking services provided to the broker-dealer independent of a relationship between the broker-dealer and the investment vehicle provider.

16. An article, comprising:
a non-transitory storage medium;
the non-transitory storage medium including stored instructions that, when executed by a processor, are operable to:
initiate a brokerage transaction between a broker-dealer and an investment vehicle provider when an integrated banking transaction services processor is in receipt of an instrument from a client of the broker-dealer;
transmit a notification message from the integrated banking transaction services processor to the broker-dealer that the instrument was presented;
receive a confirmation message by the integrated banking transaction services processor from the broker-dealer, the confirmation message comprising information as to whether to honor the instrument and initiate the brokerage transaction between the broker-dealer and the investment vehicle provider; and when the instrument is to be honored, transmit information associated with the brokerage transaction to a sub-accounting engine from the integrated banking transaction services processor to the sub-accounting engine, wherein the sub-accounting engine provides banking transaction services to the broker-dealer and the investment vehicle provider, wherein banking transaction services are provided independent of the broker-dealer relationship with the investment vehicle provider, wherein the integrated banking transaction services processor is configured to manage a cash sweep brokerage account, and wherein the sub-accounting engine provides investment vehicle options to the client in more than one investment vehicle provider without incurring instrument conversion expenses to the broker-dealer associated with changing a banking service provider.

17. The article of claim 16, wherein the stored instructions, when executed by a processor, are further operable to transmit the information associated with the brokerage transaction from the sub-accounting engine to the broker-dealer.

18. The article of claim 17, wherein the stored instructions, when executed by a processor, are further operable to transmit a request to the broker-dealer from the sub-accounting engine to execute the brokerage transaction between the broker-dealer and the investment vehicle provider.

19. The article of claim 16, wherein the stored instructions, when executed by a processor, are further operable to receive any one of a check and a debit card transaction at the integrated banking transaction services module.

20. The article of claim 16, wherein the stored instructions, when executed by a processor, are further operable to receive fees for banking services provided to the broker-dealer independent of a relationship between the broker-dealer and the investment vehicle provider.

* * * * *